(12) United States Patent
Yan et al.

(10) Patent No.: US 11,454,839 B2
(45) Date of Patent: Sep. 27, 2022

(54) TOUCH DISPLAY DEVICE COMPRISING ADHESIVE LAYER OR PROTECTIVE LAYER THAT IS OPAQUE MATERIAL FOR PREVENTING LIGHT LEAKAGE

(71) Applicant: TPK Advanced Solutions Inc., Fujian (CN)

(72) Inventors: Ren Yuan Yan, Yongtai County (CN); Ching Kai Cho, Changhua County (TW); Zhi Juan Lin, Longhai (CN); Hua Li Luo, Zhao'an County (CN); Ting Ying Liu, Longyan (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/098,529

(22) Filed: Nov. 16, 2020

(65) Prior Publication Data
US 2021/0397040 A1    Dec. 23, 2021

(30) Foreign Application Priority Data

Jun. 18, 2020  (CN) .......................... 202010560819.9

(51) Int. Cl.
*G02F 1/1335* (2006.01)
*G06F 3/044* (2006.01)
(Continued)

(52) U.S. Cl.
CPC .... *G02F 1/133512* (2013.01); *G02F 1/13338* (2013.01); *G06F 3/041* (2013.01); *G02F 2202/28* (2013.01)

(58) Field of Classification Search
CPC ...... G06F 1/1643; G06F 1/169; G06F 1/1692; G06F 3/03547; G06F 3/041–0428;
(Continued)

(56) References Cited

U.S. PATENT DOCUMENTS

| 2011/0050657 A1* | 3/2011 | Yamada | ............... H01L 27/3293 361/679.01 |
| 2011/0109596 A1* | 5/2011 | Yoon | ..................... H01L 51/524 345/204 |

(Continued)

FOREIGN PATENT DOCUMENTS

| CN | 209357032 U | 9/2019 |
| TW | 201928619 A | 7/2019 |
| TW | 201928624 A | 7/2019 |

*Primary Examiner* — Sanghyuk Park
(74) *Attorney, Agent, or Firm* — Cooper Legal Group, LLC

(57) ABSTRACT

A touch display device for preventing light leakage is provided, including a display module, a first adhesive layer, a touch sensing film, and at least one protective layer. The display module includes an upper surface, a side surface, and a lower surface. The first adhesive layer is disposed on the upper surface of the display module and is bent and extends along the side surface to the lower surface, and the touch sensing film is disposed on the first adhesive layer. The at least one protective layer is disposed on one side of the touch sensing film relative to the side surface and the lower surface of the display module. At least one of the first adhesive layer disposed on the side surface of the display module or the protective layer is an opaque material, so the thickness of the device can be reduced.

15 Claims, 3 Drawing Sheets

(51) Int. Cl.
*G06F 3/041* (2006.01)
*G02F 1/1333* (2006.01)

(58) Field of Classification Search
CPC .......... G06F 3/0488–04886; G06F 2200/0634; G06F 2200/0339; G06F 2200/04101; G06F 2200/04103–04113; G06F 2200/04809
See application file for complete search history.

(56) References Cited

U.S. PATENT DOCUMENTS

| | | | |
|---|---|---|---|
| 2014/0313440 A1* | 10/2014 | Hsu | G06F 3/0446 349/12 |
| 2015/0212548 A1* | 7/2015 | Namkung | G06F 3/0445 345/174 |
| 2017/0192134 A1* | 7/2017 | Hwang | C08K 3/041 |
| 2019/0116405 A1* | 4/2019 | Noh | G06F 1/1637 |
| 2020/0057545 A1* | 2/2020 | Seomoon | G06F 3/04883 |
| 2021/0132274 A1* | 5/2021 | Saito | G02F 1/133528 |

* cited by examiner

TOUCH DISPLAY DEVICE COMPRISING ADHESIVE LAYER OR PROTECTIVE LAYER THAT IS OPAQUE MATERIAL FOR PREVENTING LIGHT LEAKAGE

CROSS-REFERENCE TO RELATED APPLICATION

This application claims priority to China Application Serial Number 202010560819.9, filed on Jun. 18, 2020, which is herein incorporated by reference in its entirety.

BACKGROUND

Field of Disclosure

The present disclosure relates to a touch display device. More particularly, the present disclosure relates to a touch display device for preventing light leakage.

Description of Related Art

With the technical development in recent years, touch panels have been widely used in various electronic devices. Currently, narrow bezels and full screens are the trend. In the prior art, a narrow bezel design is realized by bending the circuit area on the side of the touch sensing film to the back of the liquid crystal module.

However, the folded-back design also increases the overall thickness of the touch display device.

SUMMARY

The present disclosure provides a touch display device for preventing light leakage. The effect of reducing the overall thickness of the touch display device is achieved by selecting a protective layer or a first adhesive layer as an opaque material.

The present disclosure provides a touch display device for preventing light leakage, comprising a display module, a first adhesive layer, a touch sensing film, and at least one protective layer. The display module comprises an upper surface, a side surface, and a lower surface. The first adhesive layer is disposed on the upper surface of the display module and is bent and extends along the side surface to the lower surface. The touch sensing film is disposed on the first adhesive layer. The protective layer is disposed on one side of the touch sensing film relative to the side surface and the lower surface of the display module, wherein at least one of the first adhesive layer disposed on the side surface of the display module or the protective layer is an opaque material.

In some embodiment, the display module further comprises a backlight module and a polarizer disposed on the backlight module, wherein the first adhesive layer disposed on the upper surface of the display module is adhered on the polarizer.

In some embodiment, the first adhesive layer is disposed on an end of the lower surface of the display module and is adjacent to the side surface of the display module.

In some embodiment, the protective layer comprises two protective layers respectively disposed on two sides of the touch sensing film relative to the side surface and the lower surface of the display module, wherein at least one of the two protective layers is the opaque material.

In some embodiment, the protective layer further extends to an end of the upper surface of the display module, and the protective layer is adjacent to the side surface of the display module.

In some embodiment, the protective layer has a thickness from 5 μm to 18 μm.

In some embodiment, the protective layer has an impedance from $10^9$ ohm to $10^{12}$ ohm.

In some embodiment, the opaque material has an optical density more than or equal to 4.5.

In some embodiment, the opaque material is a high resistance black ink.

In some embodiment, touch display device further comprises a cover plate disposed on the touch sensing film relative to the upper surface of the display module.

In some embodiment, touch display device further comprises a second adhesive layer disposed between the cover plate and the touch sensing film disposed on the upper surface of the display module.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides a detailed description of many different embodiments, or examples, for implementing different features of the provided subject matter. These are, of course, merely examples and are not intended to limit the invention but to illustrate it. In addition, various embodiments disclosed below may combine or substitute one embodiment with another, and may have additional embodiments in addition to those described below in a beneficial way without further description or explanation. In the following description, many specific details are set forth to provide a more thorough understanding of the present disclosure. It will be apparent, however, to those skilled in the art, that the present disclosure may be practiced without these specific details.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

A number of examples are provided herein to elaborate on the touch display device for preventing light leakage of the instant disclosure. However, the examples are for demonstration purpose alone, and the instant disclosure is not limited thereto.

EXAMPLE 1

Figure 1:
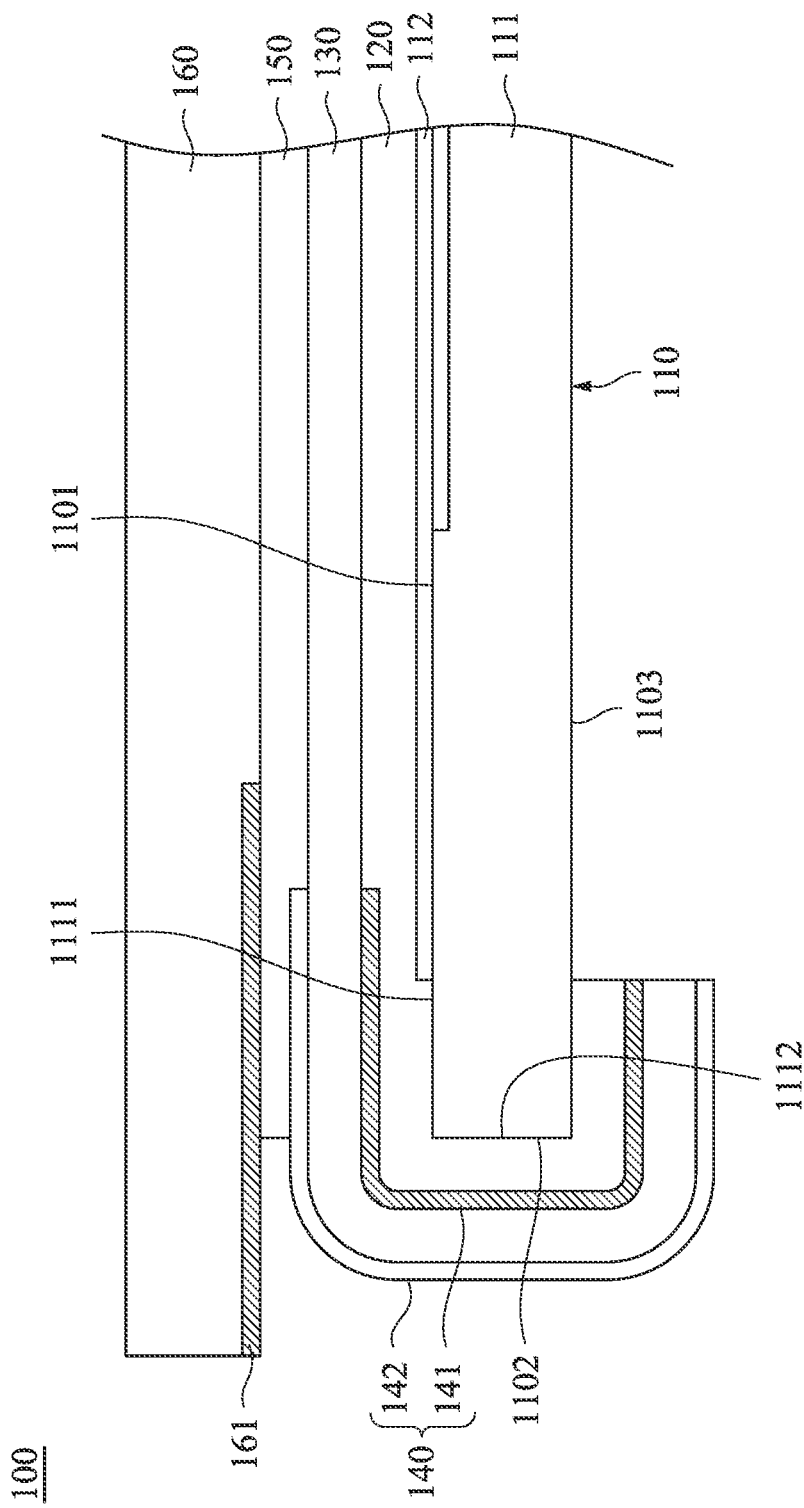
FIG. 1 depicts a cross-sectional view of the touch display device for preventing light leakage according to one embodiment of the present disclosure.

FIG. 1 depicts a cross-sectional view of the touch display device for preventing light leakage 100 according to one embodiment of the present disclosure. The touch display device for preventing light leakage 100 comprises a display module 110, a first adhesive layer 120, a touch sensing film 130, at least one protective layer 140, a second adhesive layer 150, and a cover plate 160. The display module 110 has an upper surface 1101, a side surface 1102, and a lower surface 1103. The display module 110 comprises a backlight module 111 and a polarizer 112 disposed on the backlight module 111. In one embodiment, the display module 110 further comprises a display panel (not shown) between the backlight module 111 and the polarizer 112. The backlight module 111 has a light-output surface 1111 and a lateral surface 1112, wherein the light-output surface 1111 is adjacent to the display panel, and the lateral surface 1112 of the backlight module 111 is connected to the light-output surface 1111 of the backlight module 111. In one embodiment, the display panel has an active element array substrate and a display medium layer such as a liquid crystal layer, an organic light-emitting layer, etc. The active element array substrate may include a plurality of active elements to control the properties of the display medium layer for changing bright and dark. It should be understood that the polarizer 112 is unnecessary. In some embodiment, the polarizer 112 can be omitted.

The first adhesive layer 120 is adhered to the display module 110. Specifically, the first adhesive layer 120 is adhered to the upper surface 1101, the side surface 1102, and the lower surface 1103 of the display module 110. In one embodiment, the first adhesive layer 120 is adhered to the upper surface 1101, the side surface 1102, and one end of the lower surface 1103 adjacent to the side surface 1102 of the display module 110. Specifically, the first adhesive layer 120 is disposed on the upper surface 1101 of the display module 110, and extends along the side surface 1102 and a portion of the lower surface 1103 adjacent to the side surface 1102. Thus, the first adhesive layer 120 is bent at the side surface 1102, and extends to the lower surface 1103. In one embodiment, a portion of the first adhesive layer 120 is adhered to the polarizer 112, that is, the polarizer 112 is between the backlight module 111 and the portion of the first adhesive layer 120. In one embodiment, the first adhesive layer 120 is an optical clear adhesive (OCA) which has a penetration rate to visible light (having a wavelength of 400 nm to 700 nm) of more than 60%, even more than 80%.

The touch sensing film 130 is disposed on the first adhesive layer 120, and the first adhesive layer 120 is adhered to the upper surface 1101, the side surface 1102, and the end of the lower surface 1103 adjacent to the side surface 1102 of the display module 110. Specially, the touch sensing film 130 and the first adhesive layer 120 are disposed on the upper surface 1101 of the display module 110, and extend along the side surface 1102 and the portion of the lower surface 1103 adjacent to the side surface 1102. Thus, the touch sensing film 130 and the first adhesive layer 120 are bent at the side surface 1102, and extend to the lower surface 1103.

Figure 2:
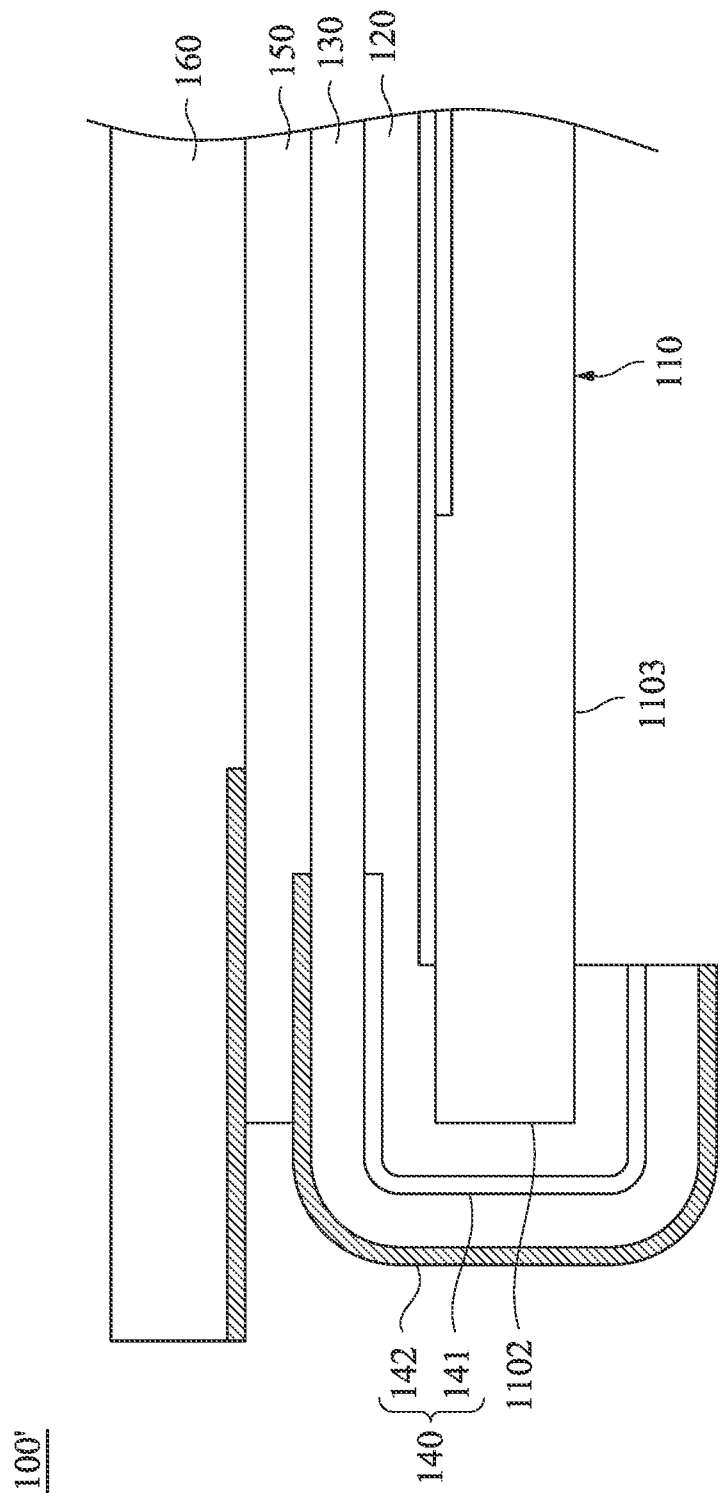
FIG. 2 depicts a cross-sectional view of the touch display device for preventing light leakage according to another one embodiment of the present disclosure.
Figure 3:
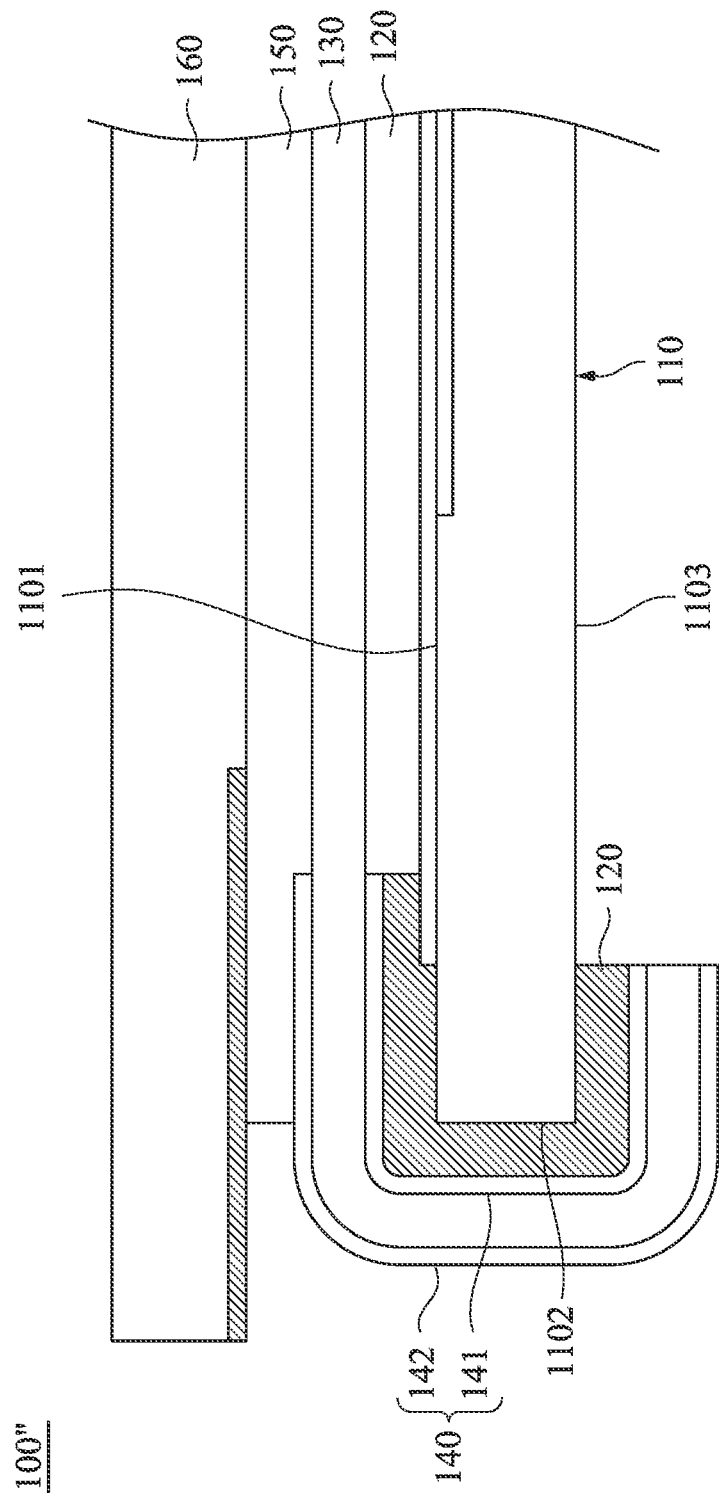
FIG. 3 depicts a cross-sectional view of the touch display device for preventing light leakage according to the other embodiment of the present disclosure.

The protective layer 140 is disposed on one of the sides of the touch sensing film 130 relative to the side surface 1102 and the lower surface 1103 of the display module 110. For example, the protective layer 140 may include a protective layer 141 disposed on the inner side of the touch sensing film 130. In one embodiment, the protective layer 140 can be two layers (as shown in FIGS. 1-3) respectively disposed on the two sides of the touch sensing film 130 relative to the side surface 1102 and the lower surface 1103 of the display module 110. That is, the protective layer 141 is disposed on the inner side of the touch sensing film 130, and the protective layer 142 is disposed on the outer side of the touch sensing film 130. In one embodiment, the protective layer 140 further extends to an end of the upper surface 1101 adjacent to the side surface 1102 of the display module 110. In one embodiment, the protective layer 140 has an impedance from $10^9$ ohm to $10^{12}$ ohm. In one example, the protective layer 140 has an impedance from $10^{10}$ ohm to $10^{11}$ ohm. In one embodiment, the protective layer 140 has a thickness from 5 μm to 18 μm. In one example, the thickness of the protective layer 140 is 6 μm, 7 μm, 8 μm, 9 μm, 10 μm, 11 μm, 12 μm, 13 μm, 14 μm, 15 μm, 16 μm, or 17 μm. In another example, the thickness of the first adhesive layer 120 is more than or equal to 50 μm and the thickness of the protective layer 140 ranges from 5 μm to 12 μm, so that there are no bubbles generated when the first adhesive layer 120, the touch sensing film 130, the protective layer 140, and the second adhesive layer 150 are adhered together. In one embodiment, the material of the protective layer 140 is a high resistance black ink which is formed from protect ink with dye or pigment to make it black. The protect ink usually includes a colored body (such as pigments, dyes, etc.), a binder, a filler, an additional material, or combinations thereof. The protect ink includes, but is not limited to epoxy, acrylic acid copolymer (also called Poly(methyl methacrylate) (PMMA)), ethyl diethylene glycol acetate, or combinations thereof.

It is worth noting that the protective layer 141 between the first adhesive layer 120 and the touch sensing film 130 is an opaque material. The opaque material is a high resistance black ink similar to the material of the protective layer 140 as above mentioned, and details are not described herein again. In one embodiment, the opaque material has an optical density more than or equal to 4.5. The protective layer 141 is the opaque material, which replaces the light leak-proof cell tape on the traditional liquid crystal module to simplify the manufacturing process and free up more space and makes the touch display device thinner and lighter. The second adhesive layer 150 is adhered to the outer side of the touch sensing film 130 relative to the upper surface 1101 of the display module 110. In one embodiment, a portion of the second adhesive layer 150 is adhered to the top of the protective layer 142 relative to the upper surface 1101 of the display module 110. In one embodiment, the second adhesive layer 150 is an optical clear adhesive (OCA) which has a penetration rate to visible light (having a wavelength of 400 nm to 700 nm) more than 60%, even more than 80%.

The cover plate 160 is disposed on the touch sensing film 130 relative to the upper surface 1101 of the display module 110. Specifically, the cover plate 160 is disposed on the second adhesive layer 150. In one embodiment, the cover plate 160 can be a transparent inorganic substrate, for example, a glass substrate; or a transparent organic substrate, such as a plastic substrate, for example, polyethylene terephthalate (PET), polycarbonate (PC), polyethylene (PE), or polymethylmethacrylate (PE), etc. In one embodiment, an opaque layer 161 is disposed beneath the cover plate 160 relative to the side surface 1102 of the display module 110. The opaque layer 161 can include an opaque ink, such as, black ink, white ink, etc. For example, the penetration rate of the opaque layer 161 to visible light (having a wavelength of 400 nm to 700 nm) is less than 20%.

EXAMPLE 2

FIG. 2 depicts a cross-sectional view of the touch display device for preventing light leakage 100' according to another one embodiment of the present disclosure. The touch display device for preventing light leakage 100' includes the display module 110, the first adhesive layer 120, the touch sensing film 130, two protective layers 141 and 142, the second adhesive layer 150, and the cover plate 160. The differences between example 2 and example 1 are that the protective layer 141 is transparent material, and the protective layer 142 is opaque material. The opaque material is a high resistance black ink similar to the material of the protective layer 140 as above mentioned, and details are not described herein again. In one embodiment, the opaque material has an optical density more than or equal to 4.5.

EXAMPLE 3

FIG. 3 depicts a cross-sectional view of the touch display device for preventing light leakage 100" according to another embodiment of the present disclosure. The touch display device for preventing light leakage 110" includes the display module 110, the first adhesive layer 120, the touch sensing film 130, two protective layers 141 and 142, the second adhesive layer 150, and the cover plate 160. The differences between example 3 and example 2 are that the protective layers 141, 142 are transparent material, and the first adhesive layer 120 disposed on the side surface 1102 of the display module 1100 is opaque material. In one embodiment, the first adhesive layer 120 is disposed on an end of the upper surface 1101 and an end of the lower surface 1103 of the display module 110, and the first adhesive layer 120 adjacent to the side surface 1102 of the display module 110 is opaque material. That is, most portions of the first adhesive layer 120 disposed on the upper surface 1101 of the display module 110 are transparent material, and only some of portions of the first adhesive layer 120 adjacent to the side surface 1102 are opaque material. The opaque material is a high resistance black ink similar to the material of the protective layer 140 in example 1 as above mentioned, and details are not described herein again. In one embodiment, the opaque material has an optical density more than or equal to 4.5.

In some embodiment of the present disclosure, the protective layers 141, 142, the first adhesive layer 120, or the combinations thereof (each one, each two, or all of them) is the opaque material, which replaces the light leak-proof cell tape on the traditional liquid crystal module. The above features have the benefit of making the touch display device thinner and lighter and achieves narrow bezel, and the thickness of borderless touch screens can be less than 2 mm. In addition, the above features replace cell tapes to reduce process steps and production costs. Furthermore, because traditional cell tapes are prone to produce unevenness and local wrinkles when they are applied, optical clear adhesive is prone to generate bubbles if the optical clear adhesive is applied to the wrinkles. The above features also solve the problem of bubbles being easily generated when the optical clear adhesive is bonded by the cell tape during the manufacturing process.

While the disclosure has been described by way of example(s) and in terms of the preferred embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch display device for preventing light leakage, comprising:
    a display module comprising an upper surface, a side surface, and a lower surface;
    a first adhesive layer disposed on the upper surface of the display module and bent and extending along the side surface to the lower surface;
    a touch sensing film disposed on the first adhesive layer;
    at least one protective layer disposed on one side of the touch sensing film relative to the side surface and the lower surface of the display module; and
    a cover plate disposed on the touch sensing film relative to the upper surface of the display module; and
    an opaque layer disposed beneath the cover plate relative to the side surface of the display module and composed of an opaque ink, wherein:
        at least one of the first adhesive layer disposed on the side surface of the display module or the protective layer is an opaque material,
        the opaque material is a high resistance black ink, and
        the protective layer is between the display module and the cover plate.

2. The touch display device of claim 1, wherein the display module further comprises a backlight module and a polarizer disposed on the backlight module, wherein the first adhesive layer disposed on the upper surface of the display module is adhered on the polarizer.

3. The touch display device of claim 1, wherein the first adhesive layer is disposed on an end of the lower surface of the display module and is adjacent to the side surface of the display module.

4. The touch display device of claim 1, wherein the protective layer comprises two protective layers respectively disposed on two sides of the touch sensing film relative to the side surface and the lower surface of the display module, wherein at least one of the two protective layers is the opaque material.

5. The touch display device of claim 1, wherein the protective layer further extends to an end of the upper surface of the display module, and the protective layer is adjacent to the side surface of the display module.

6. The touch display device of claim 1, wherein the protective layer has a thickness from 5 μm to 18 μm.

7. The touch display device of claim 1, wherein the protective layer has an impedance from $10^9$ ohm to $10^{12}$ ohm.

8. The touch display device of claim 1, wherein the opaque material has an optical density more than or equal to 4.5.

9. The touch display device of claim 1, further comprising a second adhesive layer disposed between the cover plate and the touch sensing film disposed on the upper surface of the display module.

10. A touch display device for preventing light leakage, comprising:
   a display module comprising an upper surface, a side surface, and a lower surface;
   a first adhesive layer disposed on the upper surface of the display module and bent and extending along the side surface to the lower surface;
   a touch sensing film disposed on the first adhesive layer;
   a cover plate disposed on the touch sensing film relative to the upper surface of the display module;
   a first protective layer disposed on one side of the touch sensing film relative to the side surface and the lower surface of the display module, wherein the first protective layer is between the display module and the cover plate; and
   an opaque layer disposed beneath the cover plate relative to the side surface of the display module and composed of an opaque ink,
   wherein:
   the first protective layer is disposed between the touch sensing film and the side surface of the display module or the touch sensing film is disposed between the first protective layer and the side surface of the display module,
   an entirety of the first protective layer is an opaque material, and
   the opaque material is a high resistance black ink.

11. The touch display device of claim 10, comprising:
   a second protective layer, wherein the second protective layer is a transparent material.

12. The touch display device of claim 11, wherein:
   the first protective layer is disposed between the display module and the second protective layer.

13. The touch display device of claim 11, wherein:
   the second protective layer is disposed between the display module and the first protective layer.

14. The touch display device of claim 11, wherein the touch sensing film is disposed between the first protective layer and the second protective layer.

15. The touch display device of claim 10, wherein the first protective layer is disposed over merely a portion of the upper surface of the display module.

* * * * *